Aug. 21, 1928.

G. E. HALLENBECK

POWER ACTUATED TOOL

Filed Jan. 20, 1923        3 Sheets-Sheet 2

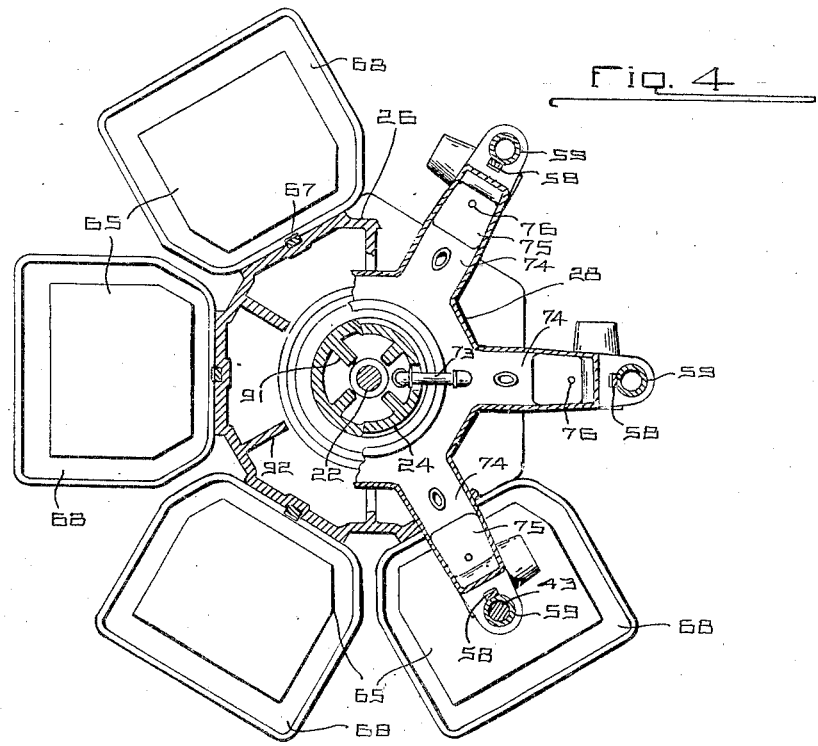
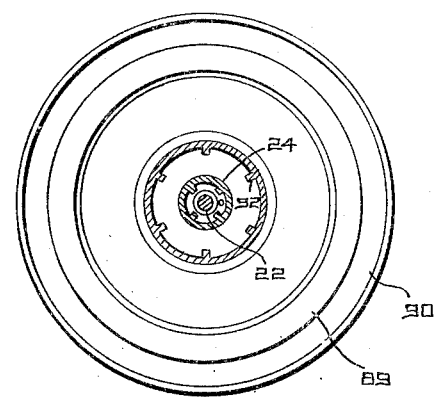
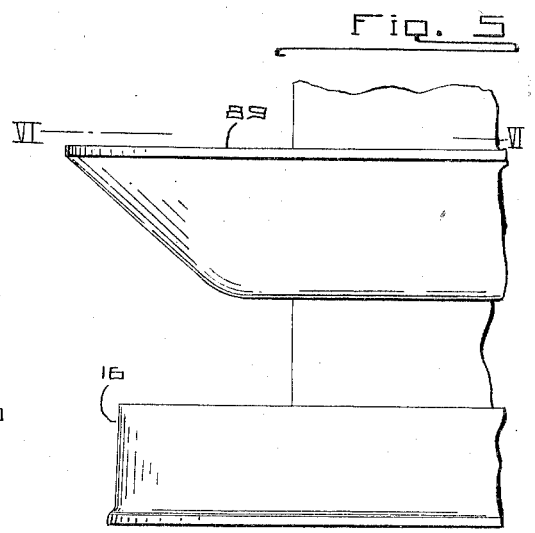

Patented Aug. 21, 1928.

1,681,403

UNITED STATES PATENT OFFICE.

GEORGE E. HALLENBECK, OF TOLEDO, OHIO, ASSIGNOR, BY MESNE ASSIGNMENTS, TO BAKER BROTHERS, INC., OF TOLEDO, OHIO, A CORPORATION OF OHIO.

POWER-ACTUATED TOOL.

Application filed January 20, 1923. Serial No. 614,002.

This invention relates to machine tools.

This invention has utility when incorporated in structures operable as to a work receiving station, whereby in a limited floor space production capacity or output may be materially increased and definitely determined as to a single operator, herein disclosed as brought about by a multiple tool and work table machine.

Referring to the drawings:

Fig. 4 is a section on the line IV—IV, Fig. 1;

Fig. 5 is a fragmentary side elevation of a circular work table type of structure; and Fig. 6 is a section on the line VI—VI, Fig. 5, on a reduced scale.

Figure 1:
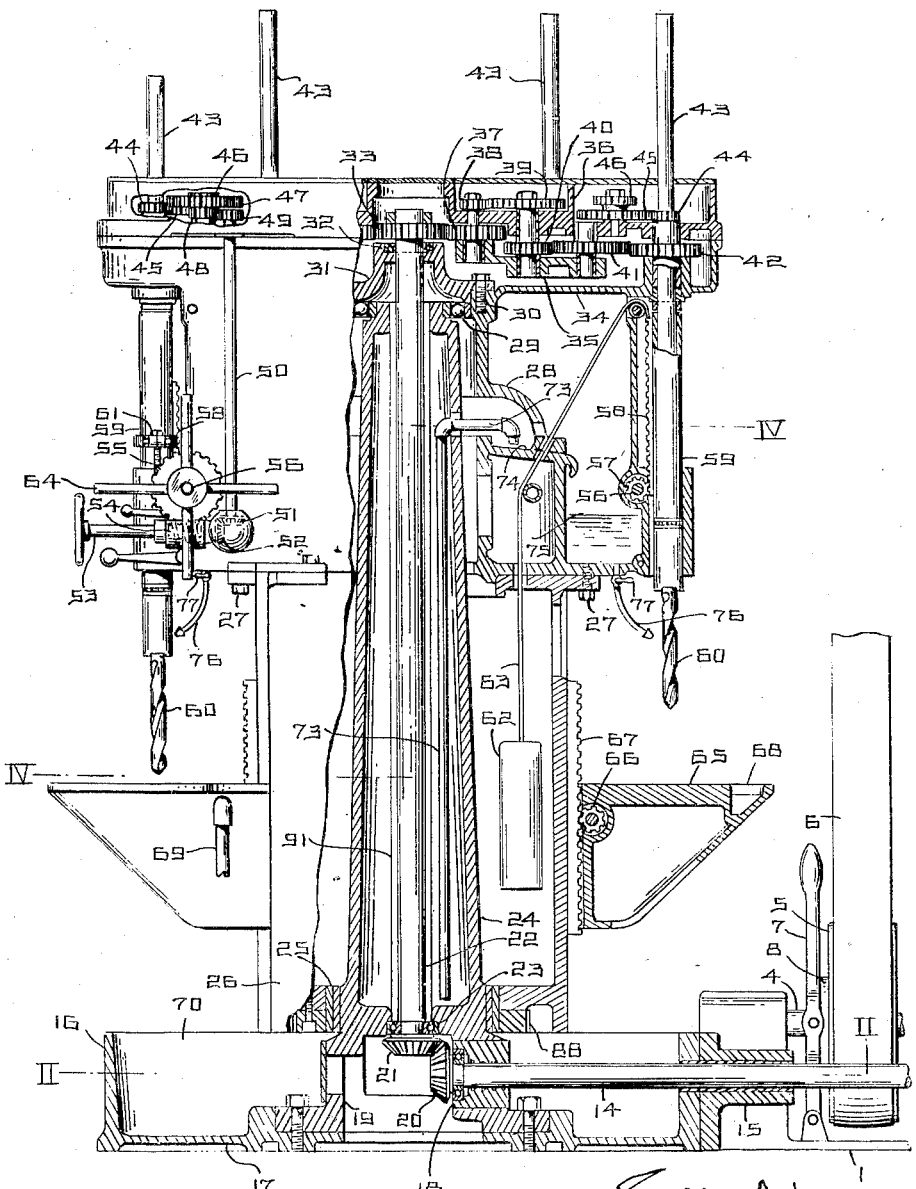
Fig. 1 is a side elevation of a drill press embodiment of the invention hereof, parts being broken away.
Figure 2:
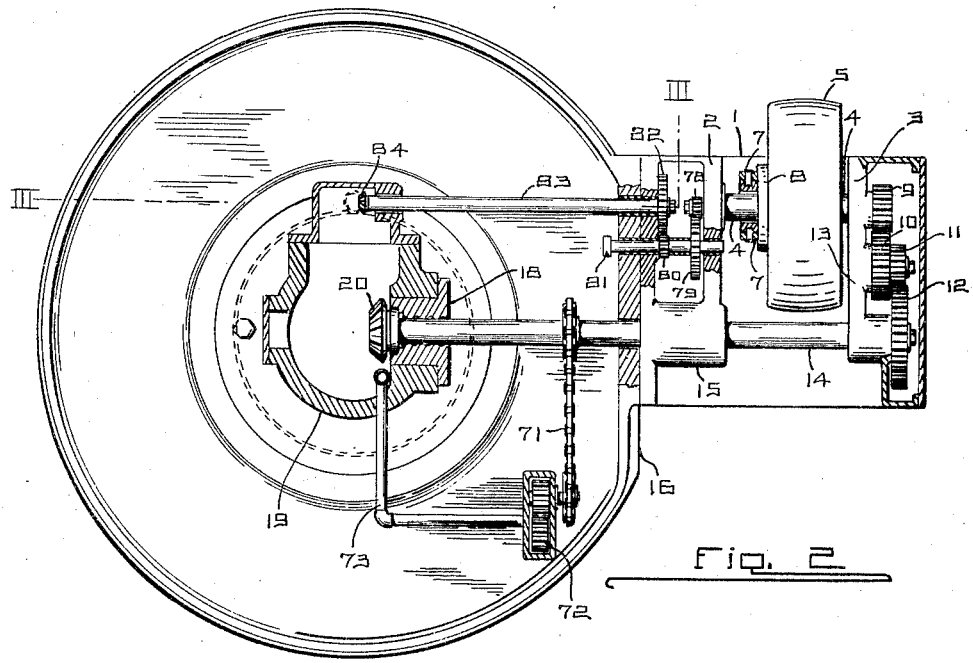
Fig. 2 is a section on the line II—II, Fig. 1.

A driving or supplemental base 1 is provided having bearings 2, 3, for a horizontal shaft 4. This shaft has a main driving pulley 5 loosely mounted thereon. Said pulley is driven by belt 6. By operating hand lever 7, clutch 8 may be thrown in to connect the pulley 5 for driving the shaft 4. This shaft 4 is connected through a train of interchangeable or substitutive gears 9, 10, 11, 12, carried by bracket 13 from the bearing 1, to drive shaft 14, parallel to the shaft 4.

This shaft 14 extends through bearing 15 carried by the supplemental base 1, and thence through upstanding flange 16 of main base 17, to centrally thereof, where this shaft 14 is supported in bearing 18 in central ring or flange 19 from this main base 17. The shaft 14 terminally carries a pinion 20 in mesh with bevel pinion 21 on upstanding shaft 22 having bearing 23 in the lower portion of column 24 rising from the flange 19.

The outer side of this column 24 near the bearing 23, has bearing 25 serving to center lower or movable base 26. This base 26 is connected by bolts 27 to be hung in suspended position by head or upper housing 28. This housing 28 is supported and centered as to the top of the column 24 by bearing 29.

Bolts 30 connect top ring or dome 31 to the head 28, and this ring 31 carries anti-friction bearing 32 for centering the vertical shaft 22 in the column 24. Upon the upper protruding end of the shaft 22 is a pinion 33 for effecting the tool drive for the gang or group of progressing operations as simultaneously occurring in cycles. The tool driving and feeding mechanism may be of the quick change type. However, in much of the work for which this disclosure has peculiar adaptation, there is a setting for a maintained production, and to this end an interchangeable or substitutive gear train may be adopted as a simplified installation, with a most wide range of speeds.

According to the individual tool capacity desired for each installation, the head 28 may be provided with radial housing sections or arms 34, carrying blocks or bearing providing members 35, 36, for interchangeable or substitutive gears 37, 38, 39, 40, 41, so that driving rotation from the pinion 33 in mesh with the gear 37 will cause the gear 41 to rotate the gear 42 splined on vertical drill spindle 43. By retaining the same distance between centers, the gears 33, 37, may be replaced by substitutive gears. By retaining the same distance between centers, the gears 38, 39, may be replaced by substitutive gears. By retaining the same distance between centers, the gears 40, 41, 42, may be replaced by substitutive gears.

Feeding of the drill spindle 43 axially is effected by pinion 44 rotative with the gear 42. This pinion 44 is in mesh with gear 45 connected through substitutive or interchangeable gears 46, 47, 48, 49, as a train for driving vertical shaft 50, connected through bevel pinions 51, 52, to drive the shaft 53 having worm 54 driving worm wheel 55 on shaft 56 carrying pinion 57 in mesh with rack 58 for feeding downward sleeve 59 to thereby lower the drill spindle 43 in forcing drill 60 into the work. Adjustable trip 61 carried by the sleeve 59 serves to release the shaft 53 to swing downward out of mesh with the worm wheel 55, as the feeding depth for the tool is attained. This general type of trip device is of the character shown in applicant's co-pending case resulting in Patent 1,466,128, of August 28, 1923. The tool may be automatically lifted by counterweight 62 having connection by way of line 63 to the sleeve 59. In lowering the tool to the next article of work, arms 64 may bring to the general position, and as the shaft 53 is reset to bring the worm 54 into mesh with the worm wheel 55, the hand wheel on the shaft 53 may be used for the closer adjustment.

Opposing each tool 60 may be a work holding table 65 having its height or position adjusted by a pinion 66 in mesh with a rack 67 for anchoring as desired with suspended base 26.

In the operation of tools, especially at high speed, it is desirable to supply a cooling medium in the nature of a wash or liquid, which may flow from the table main portion 65 into trough 68 and pass by overflow or drain pipe 69 to catch basin or reservoir 70 in the base 17 between the flanges 16, 19. Gearing 71 from the shaft 14 drives rotary pump 72 for recirculating this liquid coming to the reservoir 70, by elevating or forcing such liquid by way of pipe 73 to be discharged upon inclined portion 74 to flow down into reservoir 75, from which duct 76 as controlled by valve 77 may direct the liquid upon the tool or work.

At a radial position, say adjacent the base 1, may be the station for a single attendant or operator who may remove finished work and reset new work upon the successive table as coming to such station. Each tool as continuously rotated, has its reciprocation automatically controlled in the progressive or sequential operation as simultaneously occurring. As the feeding depth to which the tool is set to operate has been accomplished, there is automatic tripping, separately adjustable as to each tool. Each tool and its adjustments, driving and control is open to ranges independently of each other tool, and as herein thus far disclosed, the tables are likewise susceptible of independent adjustment. With a single supply of material for work, and a single discharge for completed work, all at the operator's station, the operator's duties are local and are performed with a maximum of convenience. Furthermore, the machine travel may be set for an output rate, maintain speed of production, a feature of great importance in computing costs and economy in manufacture.

The production control, or rotative travel rate of the head to give revolution to the rotating tools, as herein disclosed may be an escapement or permissive speed, as distinguished from a positive drive. The working loads up on the driving gear 33 from the several drill spindle driving trains in operation sets up a torque tending to rotate the head 28 and parts carried thereby, about the column.

Figure 3:
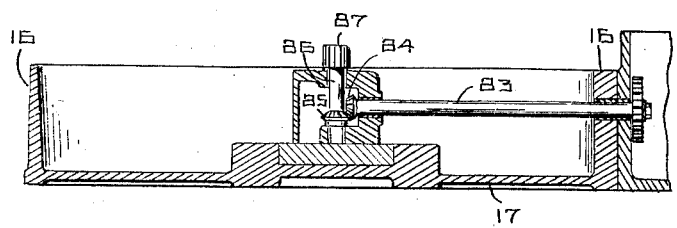
Fig. 3 is a section on the line III—III, Fig. 2.

There is herein introduced a variable speed control for the head rotation. Upon the shaft 4, remote from the pinion 9, is pinion 78 adjacent the bearing 2, in mesh with gear 79 on a sleeve with gear 80, mounted in position by removable pin or shaft 81. The gear 80 is in mesh with gear 82 in this change speed substitutive or interchangeable gear train control of shaft 83 extending parallel to the shaft 14. This shaft 83 extends across the reservoir 70 and terminates in bevel pinion 84 in mesh with bevel pinon 85 (Fig. 3) on vertical shaft 86 having at its upper extremity pinion 87 in mesh with gear wheel 88 on the bearing 25 and fixed with the base 26. There is accordingly established a rate of relative rotation between the pinion 87 and the gear 88, as to the driving rate for the vertical shaft 22 in the column 24, and such rate may be proportioned for maintained output consistent with the work to be performed by the tools, and the speed with which the operator may remove and place work. With these factors determined, the machine may be operated for definite output.

In those instances where the output is to be maintained for the same character of work to oppose each tool, instead of independent tables 65, a continuous or ring table 89 instead of the base 26, may be provided with a trough 90 for the tool cooling liquid to drain into. (Figs. 5, 6.)

The column 24 may be strengthened by reinforcing ribs 91, and the chambered base 26 may be stiffened by reinforcing webs or flanges 92. This general rotating structure is accordingly stiff in itself to withstand the reactions between the tools and the work. There are accordingly no great strains to be taken by the column. The column carries the load, which hangs down. That is, the load of the tools and work tables is carried from above the center of gravity thereof. With the center of gravity thus below the point of support, there is stability. The distribution of this load in such number of tools in the radial group as may be desired aggregates a balanced relation with the center of gravity really within the column and below the point of support for the rotating mass. As the tables and opposing tools have their reactions directly taken up therebetween, such operations do not tend to unbalance the machine.

What is claimed and it is desired to secure by Letters Patent is:

1. A tool carrier, means controlling the rotation of said carrier, a plurality of spindles carried thereby, spindle rotating means, independent feed means for each spindle actuable from said driving means, individually controlled trip means for each spindle feed means, and automatic spindle recover means for each spindle as tripped.

2. A tool carrier, means controlling the rotation of said carrier, a plurality of spindles carried thereby, feed devices for axially moving each spindle independently, driving means for the spindle and devices, and quick set means for said devices as to positioning the spindles to the work.

3. A tool carrier, means controlling the rotation of said carrier, a plurality of spindles carried thereby, feed devices for axially moving each spindle independently, quick set means for positioning the spindles for feed device operation thereof, tables for carrying work to be acted upon by the fed spindles, said tables and carrier being connected as a unit, a support for the unit, and driving means from the support for said unit including connections for rotating the spindles and rotating said devices.

In witness whereof I affix my signature.

GEORGE E. HALLENBECK.